United States Patent [19]
Wong et al.

[11] Patent Number: 5,469,046
[45] Date of Patent: Nov. 21, 1995

[54] TRANSFORMERLESS LOW VOLTAGE SWITCHING POWER SUPPLY

[75] Inventors: Stephen L. Wong, Scarsdale; Naveed Majid, Mohegan Lake, both of N.Y.

[73] Assignee: North American Philips Corporation, New York, N.Y.

[21] Appl. No.: 55,655

[22] Filed: Apr. 30, 1993

[51] Int. Cl.$^6$ .................................................. G05F 1/565
[52] U.S. Cl. ........................... 323/286; 323/285; 323/282
[58] Field of Search .................................. 323/282, 284, 323/285, 286, 351

[56] References Cited

U.S. PATENT DOCUMENTS

| | | | |
|---|---|---|---|
| 3,323,034 | 5/1967 | Dubin et al. | 323/285 |
| 4,242,629 | 12/1980 | Shuey | 323/282 |
| 4,685,046 | 8/1987 | Sanders | 363/89 |
| 4,709,322 | 11/1987 | Mirow | 323/285 |
| 4,771,373 | 9/1988 | Rademaker | 363/89 |
| 4,967,138 | 10/1990 | Obergfell et al. | 323/286 |
| 5,180,964 | 1/1993 | Ewing | 323/285 |
| 5,373,225 | 12/1994 | Poletto et al. | 323/351 |

FOREIGN PATENT DOCUMENTS

| | | | |
|---|---|---|---|
| 0256569 | 2/1988 | European Pat. Off. | H02M 3/156 |
| 3304759 | 8/1984 | Germany | H02M 3/155 |

*Primary Examiner*—Jeffrey L. Sterrett
*Attorney, Agent, or Firm*—Bernard Franzblau

[57] ABSTRACT

A power supply system employs a control circuit to regulate the voltage across a load capacitor by monitoring the capacitor voltage by means of a differential voltage sensor and by monitoring the drain-source voltage of a switching power FET connected in series with the load capacitor across input terminals that supply a full wave rectified voltage derived from a commercial AC supply voltage. The control circuit controls the switching action of the power FET in a manner such that the load capacitor is charged at least once during each cycle of the rectified voltage (unfiltered). This method of voltage regulation by monitoring the load capacitor voltage and the FET voltage ($V_{ds}$) provides significant advantages over other forms of voltage regulation.

17 Claims, 3 Drawing Sheets

TRANSFORMERLESS LOW VOLTAGE SWITCHING POWER SUPPLY

BACKGROUND OF THE INVENTION

This invention relates to power supply circuits, and more particularly, to a low power transformerless, inductorless power supply circuit of the switching type.

One common form of power supply, which can be found in certain TV receivers, consists of a full wave bridge rectifier, a load capacitor (e.g. 330 µF), and a linear regulator. The bridge rectifier generates a voltage which is filtered by the load capacitor. The load capacitor voltage is then fed to the linear regulator which in turn regulates the voltage at a preselected level, for example, 130 V.

This power supply has certain disadvantages and limitations. For a 120 V AC input, 170 V is generated across the load capacitor of the bridge rectifier. Since the linear regulator must produce an output voltage of 130 V, there is a 40 V drop across the regulator itself, drawing up to 1 amp of current. In order to protect the regulator from damage due to the excessive amount of dissipated power, a number of thermal resistors are connected in parallel with the regulator so as to shunt a part of the current. These resistors are bulky and thus are undesirable as they increase the cost of the overall system and furthermore occupy a significant amount of space on the TV board. In addition, they allow only a small variation in the line voltage because if the voltage rating of the load capacitor is exceeded, damage to the load capacitor as well as the linear regulator may occur. This power supply therefore requires a well regulated 120 V commercial line voltage. Since the load capacitor is charged only once for each half cycle of the AC supply voltage, higher peak capacitor charge currents result, along with other attendant difficulties.

U.S. Pat. No. 4,685,046 (8/4/87) describes a transformerless, low voltage, direct current power supply of the switching type adapted to energize a low voltage direct current load. A full-wave bridge rectifier is coupled directly across a 115 V, 60 Hz alternating current line to provide a 120 Hz pulsating direct current. A pair of transistors, alternately switching on and off in complementary fashion, continuously applies to a low power load only a leading edge portion and a trailing edge portion of each of the 120 Hz direct current pulses. The resultant direct current voltage, e.g. 11.3 peak volts across the load, is thus substantially reduced to a desirable level as compared to the peak voltage (161 peak volts) of the pulsating direct current provided at the bridge output. In another embodiment, the function of the transistors is provided by a pair of operational amplifiers which control the switching of a field effect transistor in series with the load. The control function is provided by sensing the input voltage of the power supply circuit. This has the disadvantage that if the input changes too abruptly and the output is not able to respond immediately to the change, the exact value of the output voltage cannot be well controlled. Furthermore, because the circuit threshold level is set by means of a zener diode, this makes the circuit less flexible in the event that the threshold has to be adjusted.

Another transformerless power supply which also senses the input supply voltage to determine the output voltage is described in DE 3304759 (8/16/84). In this German patent, a first op-amp compares a first input voltage, supplied by a full wave bridge rectifier, with a DC reference voltage supplied by a zener diode and a resistor voltage divider and a second op-amp compares a second input voltage with the DC reference voltage. If either input voltage is lower than the reference voltage, a switching transistor in series with a load capacitor is turned on. The load capacitor is only charged when the rectified AC supply voltage is below the reference voltage. The control function is once again provided by sensing the input voltage. This circuit uses a high-side power switch which produces higher power losses when compared with a low-side switch and results in problems in the integration thereof.

SUMMARY OF THE INVENTION

An object of the present invention is to provide an integrated circuit low cost power supply that produces a regulated DC voltage across a load capacitor from a wide input voltage range, in particular, one which can be used with both 120 V and 220 V AC line voltages.

Another object of the invention is to provide a power supply pre-regulator circuit that overcomes the disadvantages and limitations of known circuits of this type. In particular, one that senses the output voltage instead of the input voltage.

A further object of the invention is to provide a power supply pre-regulator circuit with reduced charging currents of the load capacitor while keeping the power dissipation to a minimum.

A still further object of the invention is to provide a power supply in which the switching losses in the power switching transistor are kept low by monitoring the power switching transistor so that it is switched only when its drain-source voltage ($V_{ds}$) is below a safe level, for example, 60 V.

Another object of the invention is to provide a power supply system which eliminates the need for bulky thermal shunt resistors and hence reduces the thermal dissipation of the system.

These and other objects and advantages are achieved by means of a novel integrated circuit power supply system that charges a load capacitor during the rising edge of the input cycle. The system includes a control circuit that senses the output voltage across the load capacitor and whenever the capacitor voltage exceeds a preset voltage level, for example, 150 V, it turns off a series connected power switch, such as a field effect transistor (FET), which stops the load capacitor from being charged. The full-wave rectified AC sinusoidal supply voltage is applied to the series circuit of the load capacitor and the power switch and, during the falling edge of the rectified half cycle of the supply voltage, the control circuit senses when the drain-source voltage of the power switching transistor reaches a preset safe level (e.g. 60 V) and in response switches on the power switching transistor to charge the load capacitor for a second time during that cycle until the input voltage drops below the capacitor voltage. The transistor switch remains on so that on the next leading (rising) edge of the rectified supply voltage, i.e. when the supply voltage again exceeds the load capacitor voltage, the load capacitor is once again recharged. The control circuit then switches off the series connected switching transistor when the load capacitor voltage (i.e., the output voltage) again exceeds the preset voltage level (e.g. 150 V). In this way, the load capacitor is charged twice during each half cycle of the AC supply voltage (or twice during each cycle of the rectified pulsatory voltage at the output of the full wave bridge rectifier circuit).

The load voltage can thus be regulated to any preset threshold level that is determined by a reference voltage. Unlike previous methods, this level would not be affected by the amplitude or rate of change of the input voltage. The power switch is a low-side switch in common source configuration which has the advantages of low power loss and ease of implementation and integration. The dual charging technique of the load capacitor minimizes the ripple voltage across the load.

An advantage of this so-called output sensing approach in which the load capacitor voltage and the switching transistor drain-source voltage are monitored rather than the input voltage is that it maintains direct control of the load capacitor voltage while charging the capacitor twice in each cycle. This has a very real advantage in that the output voltage can be more accurately regulated over a much wider range of input voltage.

To summarize, the control circuit senses the load capacitor voltage and when it exceeds the preset level (e.g. 150 V), the power switching device is turned off. The control circuit also senses the drain-source voltage and allows the power switching device to be turned back on when its drain-source voltage falls below a safe level (e.g. 60 V). This allows the load capacitor to be charged a second time to produce a second peak. The switching losses are kept to a minimum by switching the power device only when its drain-source voltage is below the safe level. The peak charging currents of the load capacitor are maintained at a low value and the circuit power dissipation is kept at a minimum.

BRIEF DESCRIPTION OF THE DRAWINGS

A fuller understanding of the invention together with other features, objects and advantages thereof will become apparent from the following detailed description taken in conjunction with the accompanying drawings, in which.

DESCRIPTION OF THE PREFERRED EMBODIMENTS

Figure 1:
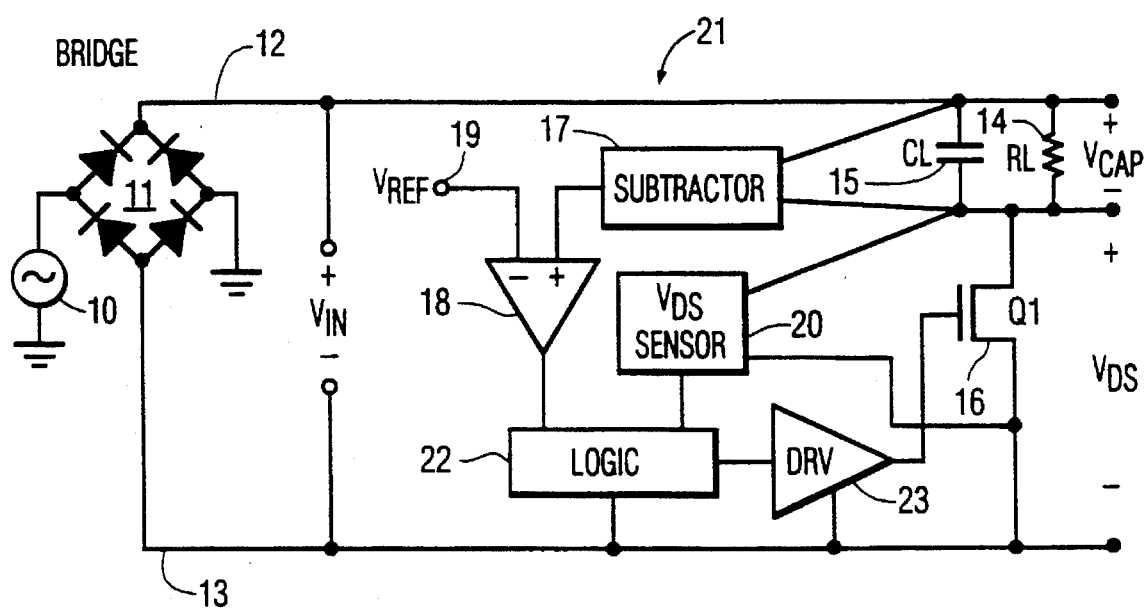
FIG. 1 illustrates a simplified block diagram of a preferred embodiment of a power supply in accordance with the present invention, FIG. 2 provides waveform diagrams illustrating the operation of the circuit of FIG. 1.

FIG. 1 shows a block diagram of a pre-regulator power supply employing the capacitor dual charging concept of the present invention. A conventional, commercial power source 10 of 115 V or 220 V sinusoidal alternating current at a frequency of 60 Hz or the like is coupled to a pair of input terminals of a full-wave bridge rectifier 11 made up of four diodes. The output of the bridge will provide a pulsating rectified voltage, $V_{in}$, between a positive voltage line 12 and a negative voltage line 13.

An electric load 14 is connected in parallel with a filter or load capacitor 15 and this parallel combination is connected in series circuit with a switching control FET 16 of a power type that can handle the load current. The power switch 16 is preferably connected to the low voltage side of the DC supply voltage which thus simplifies its integration into an integrated circuit. The field effect transistor is preferably chosen to be an LIGBT power device or an LDMOS device. Of course, the invention is not limited to this choice of the power devices.

A control circuit 21 includes a subtractor circuit 17 which is coupled across the terminals of the load capacitor 15 in order to sense the capacitor voltage. A means for differential voltage sensing is required rather than a single-ended voltage sensor. The subtractor circuit may or may not include a hysterisis circuit, which helps suppress any spurious inputs caused by RLC ringing produced during turnoff of the power switching device 16.

The output of the subtractor circuit 17 is connected to the non-inverting input (+) of a comparator circuit 18. The inverting input (−) of the comparator is connected to a terminal 19 which supplies a preset reference voltage, $V_{ref}$. The reference voltage determines the voltage level at which the comparator will change state and can be adjustable, if desired. In one example, useful in a TV receiver, the reference voltage was selected so that the comparator changes state when the load capacitor voltage exceeds 150 V.

A circuit 20 is provided in order to sense the drain-source voltage ($V_{ds}$) of the power switch 16. As will be shown below, the $V_{ds}$ sensor circuit 20 may comprise a second comparator circuit which compares the voltage $V_{ds}$ of the FET 16 to a reference voltage which, in the present example, is chosen so that the second comparator will change state when the drain-source voltage of the power switching transistor drops below 60 V.

An output of the comparator circuit 18 and of the $V_{ds}$ sensor 20 are each connected to a respective input of a logic circuit 22, which in its simplest form could consist of a NOR gate.

The output of the logic circuit is in turn coupled to an input of a gate driver amplifier 23. The output of the driver amplifier is coupled to the gate electrode of the power switching transistor 16.

A pair of DC output terminals coupled to the load capacitor can supply the load capacitor voltage to a linear regulator circuit or the like (not shown).

Figure 2:
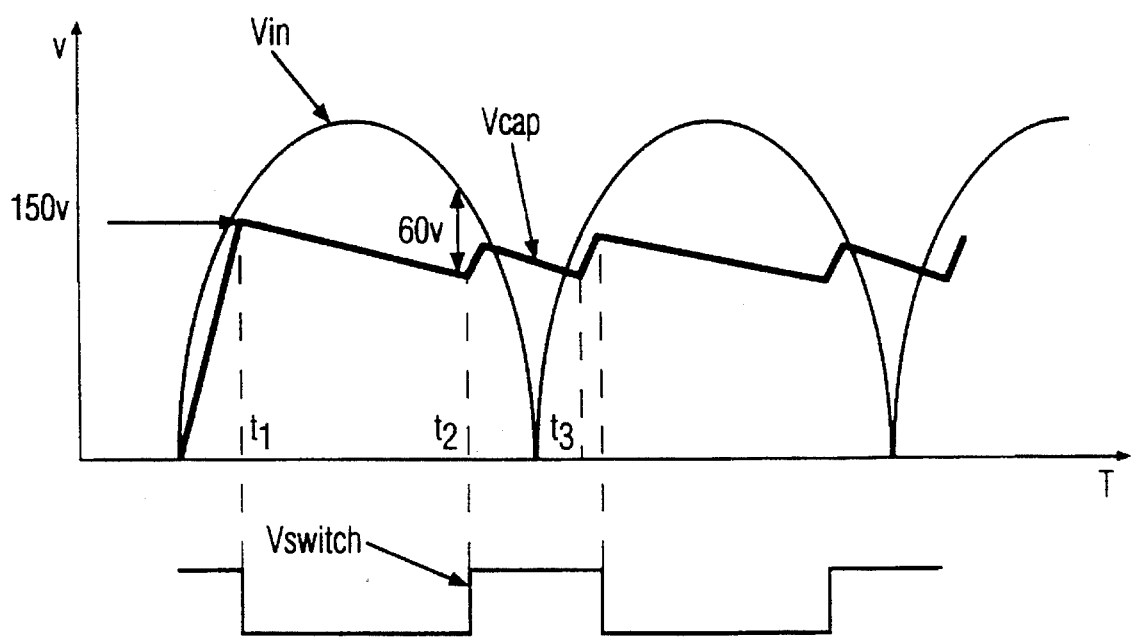

The operation of the circuit of FIG. 1 will be described in connection with the voltage waveform diagram shown in FIG. 2. The bridge rectifier circuit supplies a rectified pulsating voltage waveform $V_{in}$ as shown in FIG. 2. In the case of a 60 Hz AC supply voltage, the voltage $V_{in}$ has frequency of 120 Hz. The voltage $V_{in}$ is applied across the series circuit consisting of the load capacitor 15 and the FET power switch 16.

The function of the control circuit is to regulate the voltage across the load capacitor to a preset voltage level, for example, 150 V DC, despite the fact that the input voltage $V_{in}$ has a peak value that is higher than the preset voltage. Initially, assuming the load capacitor is uncharged, the power switch 16 is turned on fully so that substantially the entire voltage $V_{in}$ is across the load capacitor 15. This will allow the load capacitor to be charged as the voltage $V_{in}$ rises, i.e. as $V_{in}$ rises in voltage, the capacitor voltage ($V_{cap}$) also increases.

The subtractor circuit 17 continuously monitors the differential voltage $V_{cap}$ and by means of the comparator circuit compares $V_{cap}$ with a preset reference voltage, $V_{ref}$, supplied to the inverting input of the comparator. When the load capacitor voltage reaches the preset level, i.e. 150 V in the example chosen, the comparator circuit 18 changes state.

The logic circuit 22 responds to the output signal of the comparator circuit to drive the switching transistor 16 into cut-off via a gate turn-off voltage applied to the gate of FET 16 via the driver amplifier 23. This prevents further charging of the load capacitor as the input voltage $V_{in}$ increases further in value above the 150 V level. This produces a first peak in the capacitor voltage waveform at the instant labelled $t_1$ on the waveform of FIG. 2. The waveform diagram of FIG. 2 also shows the switch gate voltage waveform, which goes low at the instant $t_1$ when the switching transistor is turned off. During the time period after the switch turns off at $t_1$, the capacitor discharges slowly through the load resistor 14, as shown by the capacitor waveform in FIG. 2.

As the voltage $V_{in}$ continues to increase and the capacitor continues to discharge, the subtractor circuit may include a hysterisis circuit to maintain the comparator circuit 18 in the state to hold the switching transistor 16 off via the logic and driver stages. The hysterisis circuit can be implemented by changing the value of the reference voltage when the comparator switches states. During the time period when the power switch 16 is turned off, the drain-source voltage of transistor 16 can exceed 60 V.

After the voltage $V_{in}$ reaches its peak value and begins its descent, the drain-source voltage, $V_{ds}$, of the transistor 16 will begin to decrease. The voltage $V_{ds}$ satisfies the relation, $$V_{ds} = V_{in} - V_{cap}$$

When the voltage, $V_{ds}$, of the field effect transistor 16 drops below a second preset level, in the present example, 60 V, the $V_{ds}$ sensor circuit 20 will be triggered to change state and in turn cause the logic circuit 22 to turn the switching transistor 16 back on. This will occur at the instant $t_2$ in the waveform diagram of FIG. 2 and produces a second peak in the load capacitor voltage waveform ($V_{cap}$) as the load capacitor recharges towards the voltage $V_{in}$. The waveform diagram of FIG. 2 also shows the switch voltage waveform going high at $t_2$ when the switch is turned on. It is also possible to set the $V_{ds}$ sensor circuit to a threshold level of zero volts, in which case the circuit will not produce the second voltage peak at time $t_2$.

As the voltage, $V_{in}$, continues its descent and drops below the capacitor voltage, $V_{cap}$, in the period between $t_2$ and $t_3$, the switching transistor will stay on (be conductive), but will not continue to charge the load capacitor when the voltage $V_{in}$ has dropped below the value of the capacitor voltage.

On the rising edge of the next cycle, the voltage, $V_{in}$, will increase again until at the instant $t_3$ when $V_{in}$ exceeds the capacitor voltage $V_{cap}$, the capacitor will begin to charge again through the still conductive switching transistor 16. The first peak in the capacitor voltage waveform at a value of 150 V will then reappear as the cycle described now repeats itself. The switching transistor 16 will again be turned off when the subtractor circuit senses a differential voltage of 150 V across the load capacitor.

It can thus be seen that the control circuit 21 allows the load capacitor to be charged twice during each cycle of the rectified voltage waveform $V_{in}$ (i.e. twice during each half cycle of the AC supply voltage 10). The subtractor circuit initiates the first peak in the capacitor voltage waveform and the $V_{ds}$ sensor initiates the second peak. This technique allows the load capacitor to be charged twice in each half cycle of the AC supply voltage thereby lowering the peak charging current flowing to the load capacitor as compared to known methods in which the capacitor is charged only once for each half cycle of the AC supply voltage. The lower peak charging currents resulting from the invention produce lower stresses on the power device 16 and the lower value of $V_{ds}$ during switching of the power device reduces the switching losses and also the power dissipation. This increases the circuit efficiency and also makes it possible to use a switching transistor that is less expensive since it will be subjected to lower voltages during switching etc.

As can be seen from the foregoing description, the invention can extend the input voltage range of a TV receiver or other electronic apparatus from 120 V to 220 V or more by limiting the voltage across the load capacitor to a preset level, such as 150 V, even if the input voltage reaches a value of 265 V, AC (375 V peak). The system described insures that the load capacitor voltage does not exceed 150 V irrespective of the value of the line voltage. Switching losses are minimal as the switching transistor always switches when the input voltage is about 150 V and the drain-source voltage is low. The load capacitor voltage is very well controlled since the capacitor voltage is itself used as the control parameter.

Figure 3:
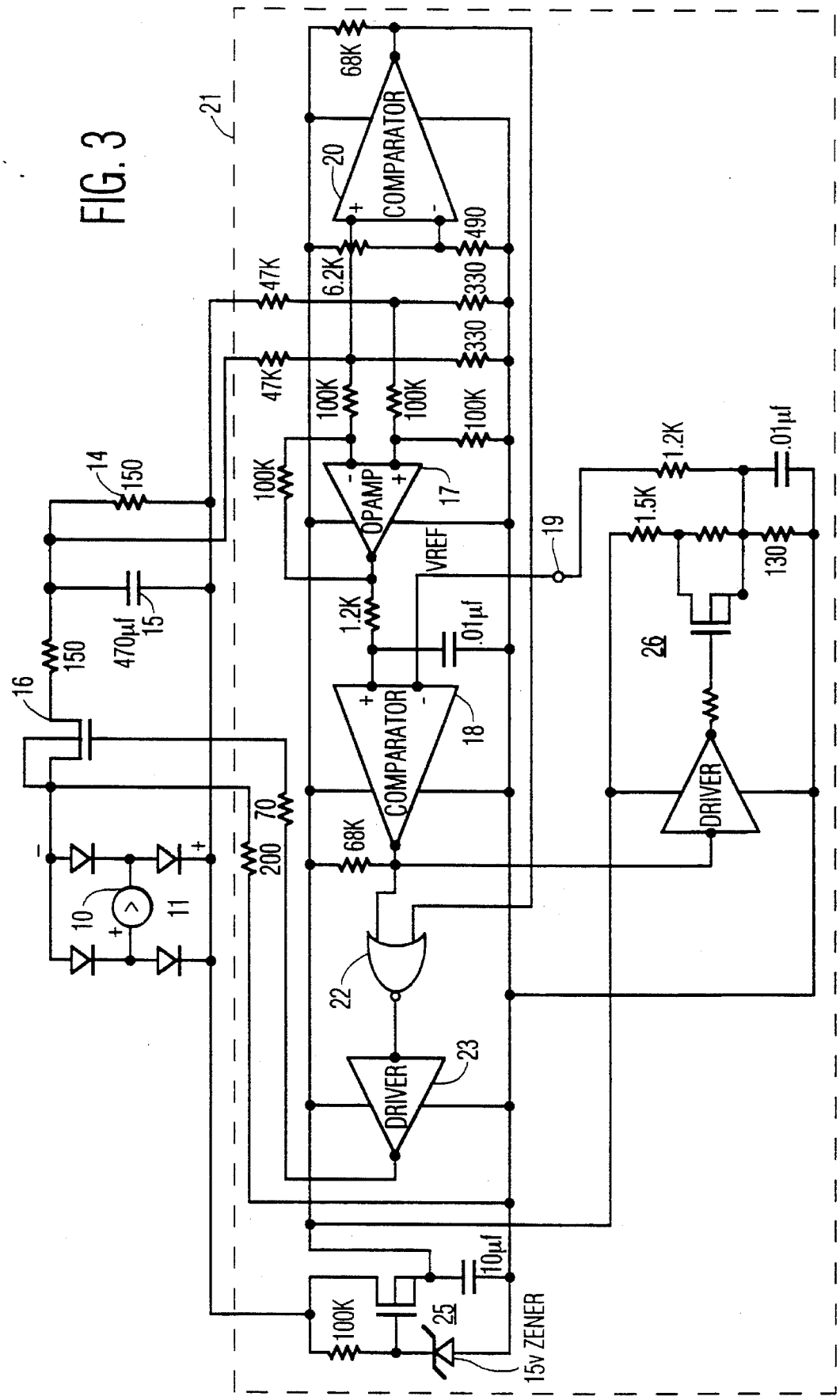
FIG. 3 is a more complete schematic circuit diagram showing one way in which the invention shown in FIG. 1 can be realized.

FIG. 3 shows one possible way to realize the complete system of FIG. 1 with the control circuit indicated by dashed lines. Elements which are the same as those in FIG. 1 have the same reference labels. The subtractor formed by the op-amp 17 attenuates and differentially senses the load capacitor voltage. The subtractor output voltage is then compared to a reference voltage using the comparator 18. The reference voltage has been selected so that the comparator changes state when the load capacitor voltage exceeds 150 V. The second comparator 20 is used to sense the drain-source voltage of the FET 16. The Input terminals of the second comparator are coupled, either directly or via some means of attenuation, to the drain electrode and the source electrode of the field effect transistor 16. Additional logic 22 uses the signals from the two comparators to control the turn on and turn off of the power device.

In addition to the functional blocks shown in FIG. 1, the control circuit of FIG. 3 also includes a low voltage supply circuit 25 which provides a regulated low DC voltage for energizing the low voltage circuits of the control circuit 21. FIG. 3 also provides a hysterisis circuit 26 which changes the level of the reference voltage supplied to the inverting input of comparator 18 via the reference voltage terminal 19. The duration of the subtractor signal voltage is thereby lengthened by the operation of the hysterisis circuit. The hysterisis circuit is itself conventional. The system of FIG. 3 operates in accordance with the description of the operation of the circuit of FIG. 1 and thus requires no further elaboration.

Although a preferred embodiment of the invention has been shown and described, it should be understood that various modifications, deletions and rearrangements of the parts may be resorted to without departing from the spirit and scope of the invention as disclosed and claimed herein.

What is claimed is:

1. A switching type regulated power supply for energizing a load comprising:

first and second input terminals for supplying a pulsatory type rectified voltage to the power supply, means for coupling a load capacitor and a switching transistor to said input terminals so that the switching transistor controls current flow through the load capacitor, a pair of output terminals coupled to the load capacitor, and a control circuit having input means coupled to the load capacitor and to the switching transistor and an output coupled to a control electrode of the switching transistor, said control circuit including means responsive to a differential voltage of the load capacitor and a voltage produced across the switching transistor for controlling the switching transistor in a manner so as to charge the load capacitor twice during each cycle of the pulsatory rectified voltage.

2. A switching type regulated power supply as claimed in claim 1 wherein the control circuit comprises;
   a first network coupled to the load capacitor and responsive to the load capacitor differential voltage for deriving a first switch-type control signal for driving the switching transistor into cut-off at a given voltage level of the load capacitor voltage, and
   a second network coupled to the switching transistor and responsive to the transistor voltage for deriving a second switch-type control signal for driving the switching transistor into conduction at a given voltage of the switching transistor.

3. A switching type regulated power supply as claimed in claim 2 wherein the control circuit further comprises;
   a logic means controlled by said first and second switch-type control signals for supplying a trigger control signal to a control electrode of the switching transistor that turns on the switching transistor to charge the load capacitor during a last part of the falling edge of the pulsatory rectified voltage and during the initial part of the rising edge of the next cycle of the pulsatory rectified voltage.

4. A switching type regulated power supply as claimed in claim 1 wherein said first and second input terminals supply a high side voltage and a low side voltage, respectively, and said load capacitor and the switching transistor are connected in a series circuit across said first and second input terminals with the capacitor connected to the first input terminal and the switching transistor connected to the second input terminal.

5. A switching type regulated power supply as claimed in claim 1 wherein said first and second input terminals supply a high side voltage and a low side voltage, respectively, and said load capacitor and said switching transistor are connected in a series circuit across the first and second input terminals in the order named.

6. A switching type regulated power supply as claimed in claim 2 wherein;
   said load capacitor and the switching transistor are connected in a series circuit across said first and second input terminals, and
   said first network comprises a subtractor circuit having its input coupled to the load capacitor and having its output coupled to a first input of a comparator, and wherein a second input of the comparator is coupled to a reference voltage that determines said given cut-off voltage level.

7. A switching type regulated power supply as claimed in claim 6 wherein the second network comprises a second comparator having its input coupled across the switching transistor.

8. A switching type regulated power supply as claimed in claim 7 wherein the switching transistor comprises a field effect transistor having a drain electrode and a source electrode and the input of the second comparator includes first and second terminals coupled to the drain electrode and the source electrode, respectively, of the field effect transistor.

9. A switching type regulated power supply as claimed in claim 1 wherein the control circuit switches the switching transistor at the frequency of the pulsatory type rectified voltage and senses the capacitor voltage to charge the capacitor at the beginning of a cycle of the pulsatory rectified voltage until a given capacitor threshold voltage is reached and senses the switching transistor voltage to charge the capacitor a second time in the same cycle and near the end thereof.

10. A switching type regulated power supply as claimed in claim 1 further comprising an effective load resistance coupled in parallel with the load capacitor.

11. A switching type regulated power supply as claimed in claim 2 wherein;
   the second input terminal is connected to the ground side of the pulsatory rectified voltage,
   said load capacitor and the switching transistor are connected in a series circuit across said first and second input terminals and the switching transistor comprises a field effect transistor having a drain electrode coupled to the load capacitor and a source electrode connected to said second input terminal, and
   the second network comprises a comparator responsive to the drain-source voltage of the field effect transistor.

12. A switching type regulated power supply as claimed in claim 1 wherein said first and second input terminals supply a rectified sine wave voltage to said first and second input terminals and said control circuit is operative to turn off the switching transistor at a given voltage level on the leading edge of the rectified sine wave voltage and to turn on the switching transistor at a preset voltage developed across the switching transistor during the trailing edge of the rectified sine wave voltage.

13. A switching type regulated power supply as claimed in claim 1 wherein the control circuit turns off the switching transistor at a first predetermined voltage level of the output load capacitor voltage which is less than the peak input voltage value of the pulsatory type rectified voltage and turns on the switching transistor at a second predetermined voltage level of the switching transistor that is independent of the load capacitor voltage.

14. A switching type regulated power supply for energizing a load comprising:
   first and second input terminals for supplying to the power supply a pulsatory type rectified voltage having a rising edge and a falling edge,
   means for coupling a load capacitor and a switching transistor to said input terminals so that the switching transistor controls current flow through the load capacitor,
   a pair of output terminals coupled to the load capacitor, and
   a control circuit having a first network coupled to the load capacitor and responsive to the load capacitor voltage for deriving a first switch-type control signal which, during said rising edge, drives the switching transistor into conduction below a given voltage level across the load capacitor and drives the switching transistor into cut-off at said given voltage level of the load capacitor voltage.

15. A switching type regulated power supply as claimed in claim 14 wherein the control circuit further comprises;
   a second network coupled to the switching transistor and responsive to the transistor voltage for deriving a second switch-type control signal for driving the switching transistor into conduction at a given voltage of the switching transistor and during both the rising and falling edges of the pulsatory type rectified voltage thereby to control the switching transistor in a manner so as to charge the load capacitor twice during each cycle of the pulsatory rectified voltage.

16. A switching type regulated power supply for energizing a load comprising:
   first and second input terminals for supplying a pulsatory rectified voltage to the power supply,
   means for coupling a load capacitor and a switching transistor in series to said input terminals so that the switching transistor controls current flow through the load capacitor, a pair of output terminals coupled to the load capacitor, a control circuit having input means coupled to the load capacitor and to the switching transistor and an output coupled to a control electrode of the switching transistor, said control circuit including, a first network coupled to the load capacitor and responsive to the load capacitor voltage for deriving a first switch-type control signal for driving the switching transistor into conduction when the capacitor voltage is below a given voltage level and into cut-off above said given voltage level, and a second network coupled to the switching transistor and responsive to the transistor voltage for deriving a second switch-type control signal for driving the switching transistor into conduction at a given voltage across the switching transistor, whereby the load capacitor is charged during a part of the rising edge of the pulsatory rectified voltage and during a part of the falling edge of the pulsatory rectified voltage so that it is charged twice during each cycle of the pulsatory rectified voltage.

17. A switching type regulated power supply as claimed in claim 16 wherein said first and second input terminals supply a high side voltage and a low side voltage, respectively, and a node is provided between the load capacitor and the switching transistor, wherein the switching transistor is a field effect transistor with its source connected to the second input terminal, its drain connected to said node, and said load capacitor has a terminal connected to the first input terminal.

* * * * *